US008319933B2

(12) United States Patent
Chiou et al.

(10) Patent No.: US 8,319,933 B2
(45) Date of Patent: Nov. 27, 2012

(54) LIQUID CRYSTAL DISPLAY PANEL

(75) Inventors: Wen-Tsan Chiou, Hsin-Chu (TW);
Yuan-Nan Chiu, Hsin-Chu (TW);
Chao-Wei Huang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 171 days.

(21) Appl. No.: 12/939,159

(22) Filed: Nov. 3, 2010

(65) Prior Publication Data

US 2011/0304811 A1 Dec. 15, 2011

(30) Foreign Application Priority Data

Jun. 11, 2010 (TW) ................................ 99119084 A

(51) Int. Cl.
*G02F 1/1339* (2006.01)
(52) U.S. Cl. .......................... 349/155; 349/156; 349/157
(58) Field of Classification Search .................. None
See application file for complete search history.

(56) References Cited

U.S. PATENT DOCUMENTS

| 7,791,705 | B2 | 9/2010 | Jang | |
| 2004/0141128 | A1* | 7/2004 | Kim et al. | 349/138 |
| 2005/0146669 | A1* | 7/2005 | Yeh et al. | 349/141 |
| 2005/0253994 | A1 | 11/2005 | Kamijima | |
| 2009/0161046 | A1* | 6/2009 | Tokuda et al. | 349/106 |
| 2009/0305444 | A1* | 12/2009 | Yoon | 438/27 |

FOREIGN PATENT DOCUMENTS

| JP | 2005326577 | 11/2005 |
| JP | 2006106793 | 4/2006 |
| JP | 2006178301 | 7/2006 |
| JP | 2006189857 | 7/2006 |

* cited by examiner

*Primary Examiner* — Thanh-Nhan P Nguyen
(74) *Attorney, Agent, or Firm* — Winston Hsu; Scott Margo

(57) ABSTRACT

A liquid crystal display panel has a display region and a peripheral region defined thereon. The peripheral region is disposed at an outside of the display region, and the peripheral region includes a bridge circuit region. The liquid crystal display panel includes a first substrate, a first conductive layer, a second substrate, a second conductive layer and a spacer. The first conductive layer is disposed on the first substrate in the bridge circuit region. The second substrate is disposed in parallel to a side of the first substrate, and the second conductive layer is disposed on the second substrate in the peripheral region. The spacer is disposed between the first conductive layer and the second conductive layer in the bridge circuit region, and the spacer electrically isolates the first conductive layer from the second conductive layer.

9 Claims, 9 Drawing Sheets

LIQUID CRYSTAL DISPLAY PANEL

BACKGROUND OF THE INVENTION

1. Field of the Invention

The present invention relates to a liquid crystal display panel, and more particularly, to a liquid crystal display panel with a spacer covering a bridge circuit region.

2. Description of the Prior Art

Generally, liquid crystal display is composed of a thin-film-transistor substrate (TFT substrate), a color-filter substrate (CF substrate), and liquid crystal filled between the two substrates. The TFT substrate has a pixel electrode layer disposed thereon, and the CF substrate has a common electrode layer disposed thereon. A voltage difference is provided between the pixel electrode layer and the common electrode layer to drive liquid crystal molecules between the pixel electrode layer and the common electrode layer. In addition, the TFT substrate of a periphery of a display region further has a wire layout disposed thereon, and the wire layout is used to transfer a driving signal to the pixel electrode layer, so that the liquid crystal molecules can be driven. The wire layout includes a plurality of metal layers without being in contact with each other. In order to electrically connect different metal layers, a transparent conductive layer, which is patterned together with the pixel electrode layer, is used to be a conductive layer for connecting different metal layers. However, the transparent conductive layer of the prior art is disposed on each metal layer, and the transparent conductive layer is electrically connected to different metal layers through a plurality of contact plugs. Furthermore, the common electrode layer extends to the outside of the display region, so that the common electrode layer can be electrically connected to the outside. During the manufacturing process of the liquid crystal display panel, the TFT substrate and the CF substrate are easily pressed or abnormally handled, so that the transparent conductive layer of the TFT substrate and the common electrode layer of the CF substrate easily approach to each other, even in contact with each other. For this reason, a short circuit between the transparent conductive layer and the common electrode layer will be generated during the manufacturing process, and further result in abnormal display of the liquid crystal display panel.

SUMMARY OF THE INVENTION

It is therefore an objective of the present invention to provide a liquid crystal display panel to avoid generating a short circuit between the TFT substrate and the CF substrate in the peripheral region.

According to an embodiment, a liquid crystal display panel has at least one display region and at least one peripheral region disposed at an outside of the display region defined thereon, and the peripheral region comprises a first bridge circuit region. The liquid crystal display panel comprises a first substrate, a passivation layer, a first conductive layer, a second substrate, a second conductive layer, and a first spacer. The first substrate has a first surface, and the passivation layer covers the first surface of the peripheral region. The first conductive layer is disposed on the passivation layer in the first bridge circuit region. The second substrate is disposed in parallel to a side of the first substrate, and the second substrate has a second surface opposite to the first surface. The second conductive layer is disposed on the second surface of the peripheral region, and the first spacer is disposed between the first conductive layer and the second conductive layer in the first bridge circuit region. The first spacer electrically insulating the first conductive layer from the second conductive layer, and the first spacer is in contact with the first conductive layer. A covering area of the first spacer is substantially larger than or equal to a covering area of the first conductive layer, and a surface of the first spacer facing the first substrate or a surface of the first spacer facing the second substrate has an uneven surface.

The present invention disposes the spacers between the first conductive layer and the second conductive layer in the peripheral region, so that the first conductive layer and the third conductive layer in the peripheral region won't be in contact with the second conductive layer 130 due to abnormal handling or pressure in any process or usage. For this reason, a short circuit between the pixel electrode and the common electrode resulted from the first conductive layer being in contact with the second conductive layer in the peripheral region can be avoided.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
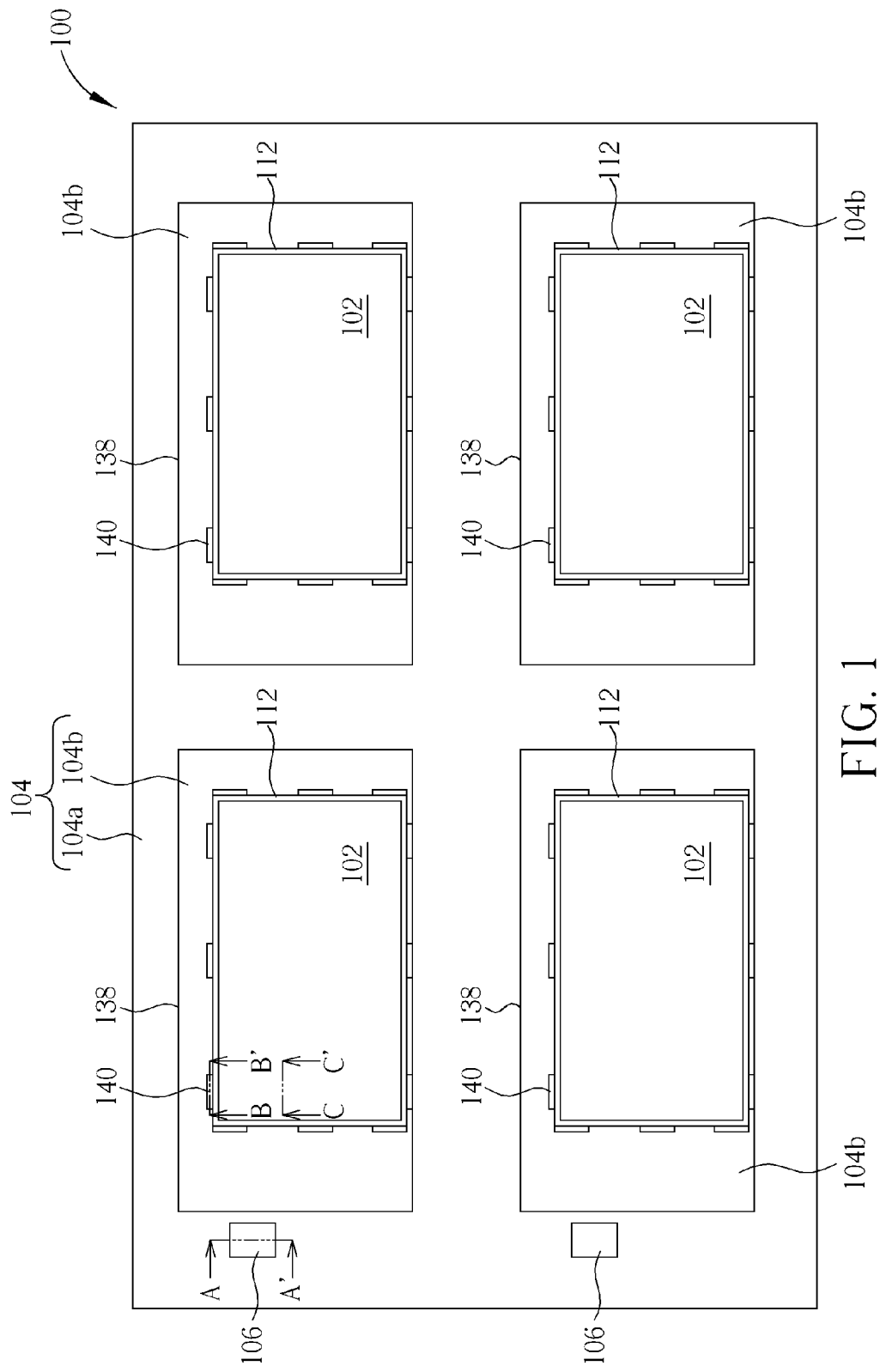
FIG. 1 is a schematic diagram illustrating a top view of the liquid crystal display panel according to a first embodiment of the present invention.
Figure 2:
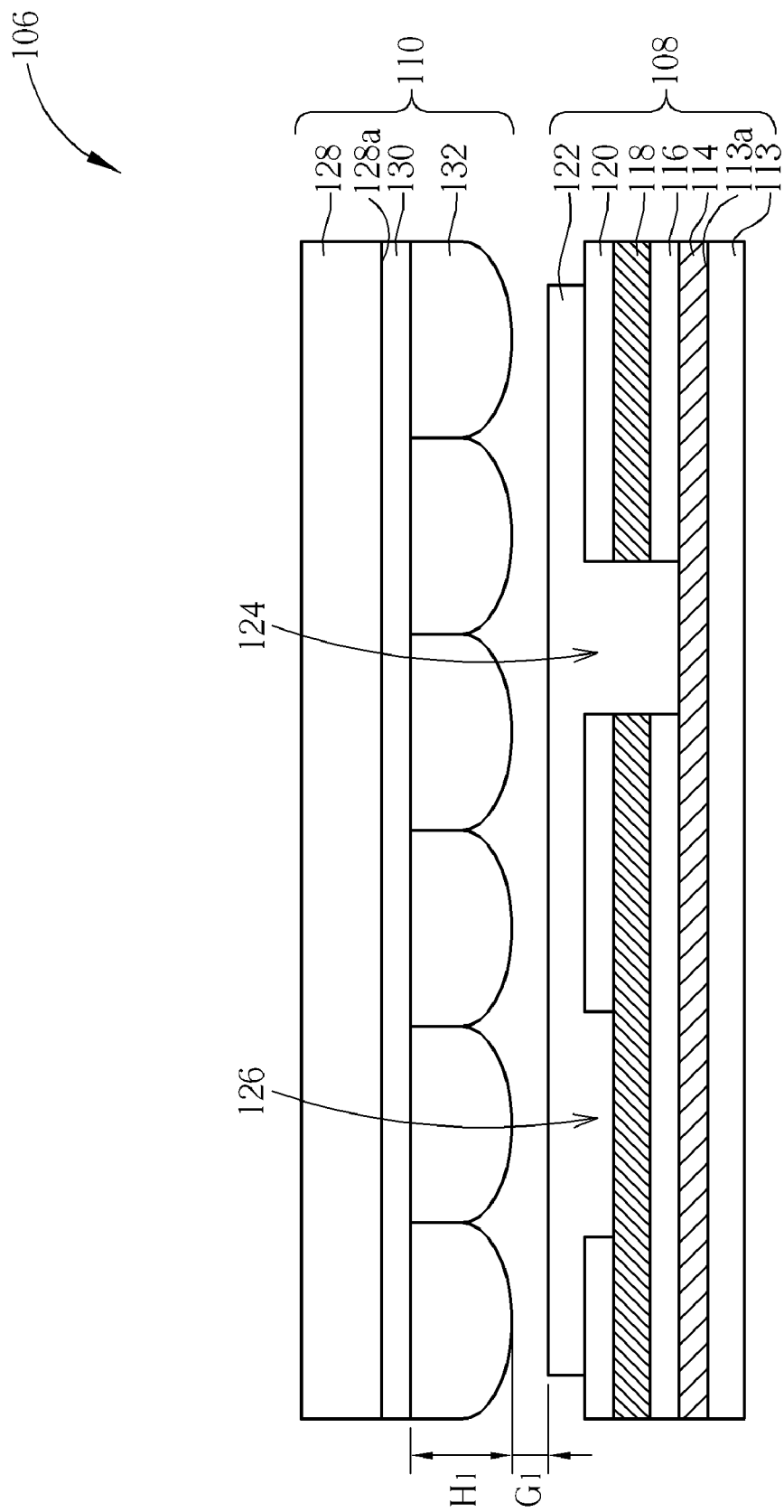
FIG. 2 is a schematic diagram illustrating a cross-sectional view taken along line AA' of the liquid crystal display panel in a peripheral region shown in FIG. 1 according to the first embodiment of the present invention.
Figure 7:
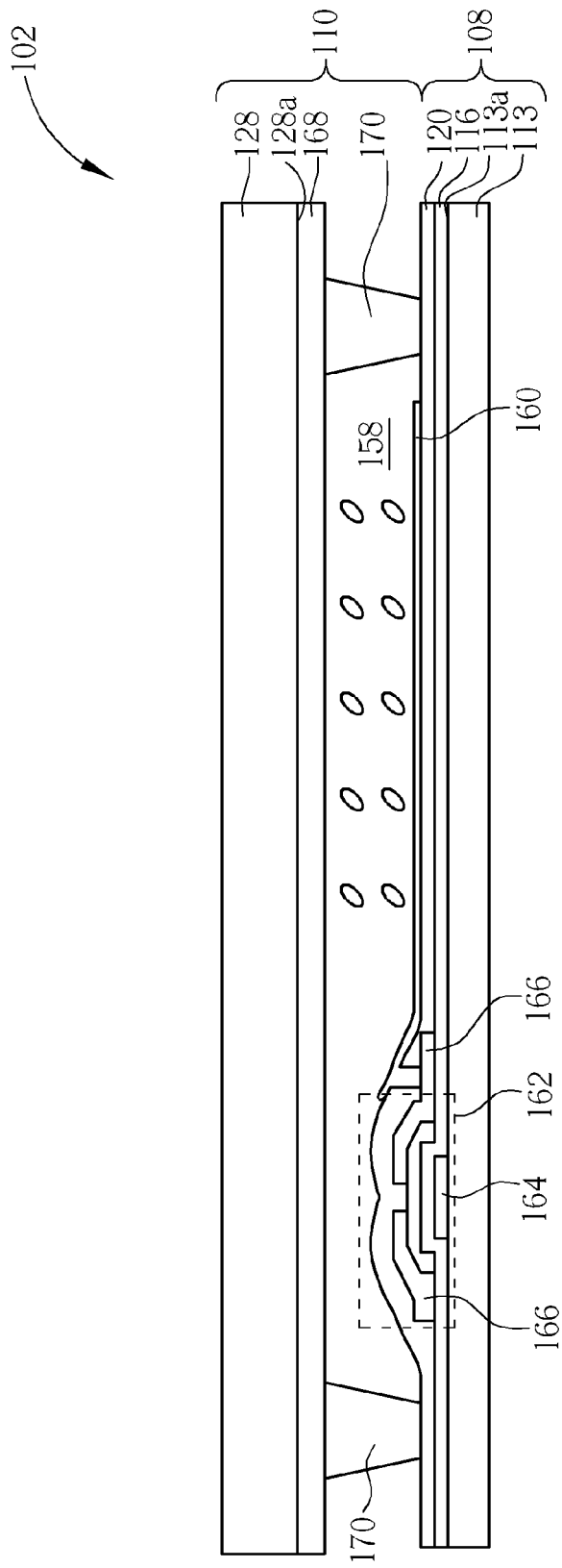
FIG. 7 is a schematic diagram illustrating a cross-sectional view taken along line CC' of the liquid crystal display panel in the display region shown in FIG. 1 according to the first embodiment of the present invention.

Referring to FIG. 1 and FIG. 2, FIG. 1 is a schematic diagram illustrating a top view of the liquid crystal display panel according to a first embodiment of the present invention, and FIG. 2 is a schematic diagram illustrating a cross-sectional view taken along line AA' of the liquid crystal display panel in a peripheral region shown in FIG. 1 according to the first embodiment of the present invention. As shown in FIG. 1 and FIG. 2, the liquid crystal display 100 has a plurality of display regions 102 and at least one peripheral region 104 disposed at an outside of the display regions 102 defined thereon, and the peripheral region 104 includes at least one first bridge circuit region 106. The liquid crystal display panel 100 of the present invention is not limited to have a plurality of display regions, and can only have one display region. It should be noted that if the liquid crystal display panel 100 shown in FIG. 1 includes a plurality of display regions 102, the liquid crystal display panel 100 also can be regarded as a liquid crystal display mother panel, and each display region 102 is regarded as a display unit. After the liquid crystal display mother panel is cut along cutting lines 138, each independent display unit is formed, and each display unit has a plurality of pixel regions. Each pixel region has at least one transistor and a pixel electrode electrically connected to the transistor, as shown in FIG. 7. If the liquid crystal display panel 100 only has a display region, the liquid crystal display panel 100 is an independent display unit. The display unit has a plurality of pixel regions, and each pixel region has at least one transistor and a pixel electrode electrically connected to the transistor, as shown in FIG. 7. The liquid crystal display panel 100 includes the TFT substrates 108, the CF substrate 110, at least one sealant 112, and at least one liquid crystal layer (not shown in FIG. 1 and FIG. 2). In addition, the TFT substrates 108 adheres to the CF substrate 110 through the sealant 112, and the sealant 112 divides the liquid crystal display panel 100 into the display regions 102 and the peripheral region 104. The TFT substrate 108 in the peripheral region 104 includes a first substrate 113, at least one first metal layer 114, an insulating layer 116, at least one second metal layer 118, a passivation layer 120, and at least one first conductive layer 122. The first substrate 113 has a first surface 113a, and the first metal layer 114 is disposed on the first surface 113a in the peripheral region 104. The insulating layer 116 is disposed on the first metal layer 114, and the insulating layer 116 in the first bridge circuit region 106 has a first opening 124 that exposes a part of the first metal layer 114. The second metal layer 118 is disposed on the insulating layer 116, and has the first opening 124. The passivation layer 120 is disposed on the second metal layer 118, and also has the first opening 124. The passivation layer 120 in the first bridge circuit region 106 further has a second opening 126 that exposes a part of the second metal layer 118. The first conductive layer 122 is disposed in the first bridge circuit region 106, and the first conductive layer 122 covers the passivation layer 120, the first metal layer 114 and the first metal layer 118. The first opening 124 and the second opening 126 are filled with the first conductive layer 122, so that the first conductive layer electrically connect the first metal layer 114 and the second metal layer 118. For this reason, the first conductive layer 122 can be used as a bridge circuit, and the first metal layer 114, the first conductive layer 122 and the second metal layer 118 can constitute a wire layout for connecting to the outside, such as the wire layout of a detecting circuit for the liquid crystal display panel or a wire layout used for manufacturing the liquid crystal display panel.

Furthermore, the CF substrate 110 in the peripheral region 104 includes a second substrate 128, a second conductive layer 130 and at least one first spacer 132, and the second substrate 128 is disposed in parallel to a side of the first substrate 113. The second substrate 128 has a second surface 128a opposite to the first surface 113a. In this embodiment, the second conductive layer 130 covers the second surface 128a of the second substrate 128 in the peripheral region 104, and the first spacer 132 is disposed on the second conductive 130 and directly in contact with the second conductive layer 130. The first conductive layer 122 and the second conductive layer 130 can be composed of transparent conductive materials, such as indium tin oxide (ITO) or indium zinc oxide (IZO), etc., or the first conductive layer 122 also can be composed of other conductive materials different from the second conductive layer 130. The first spacer 132 and the first conductive layer 122 have a gap $G_1$ between them, and the first spacer 132 has a height $H_1$.

Figure 3:
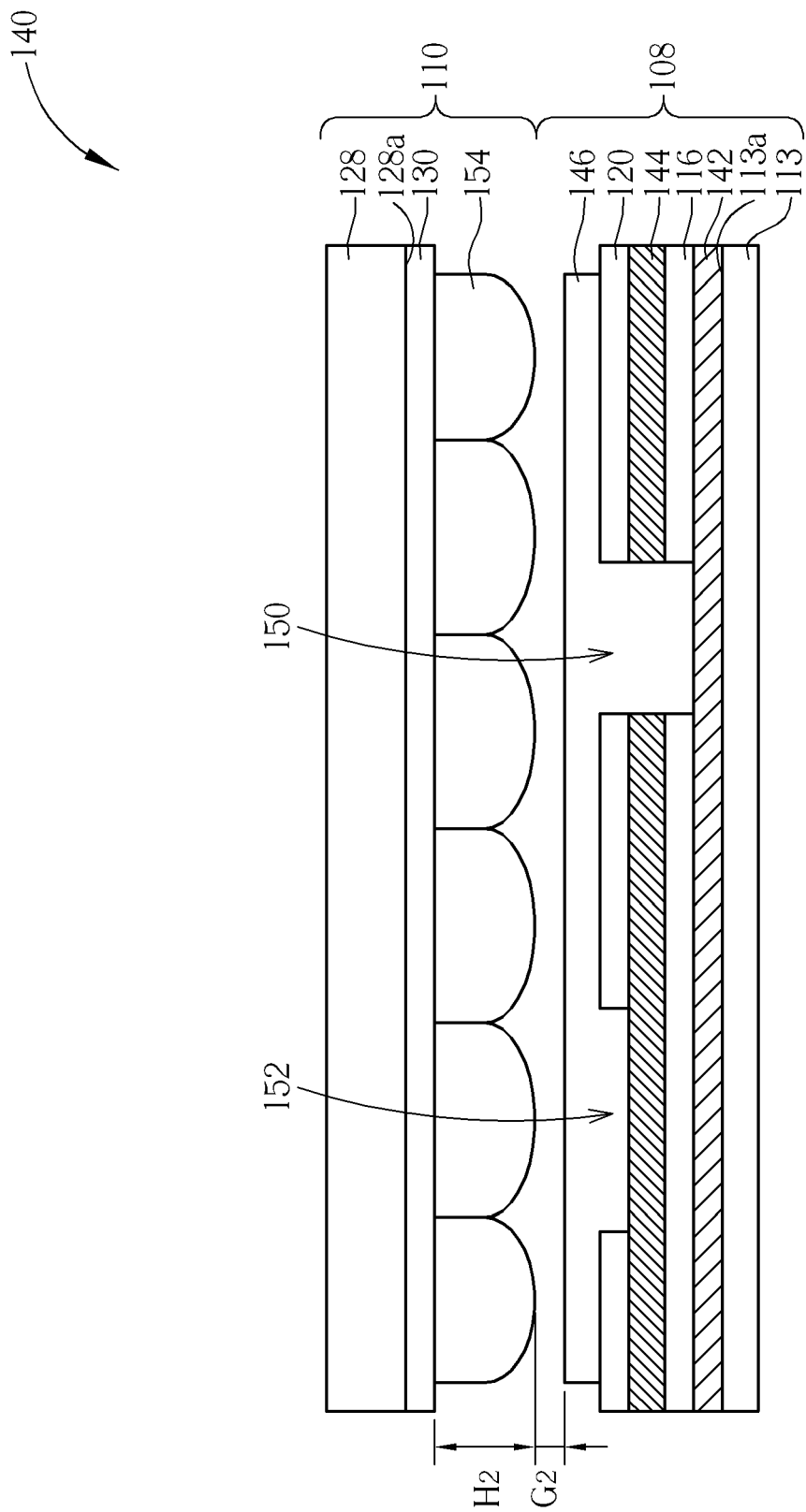
FIG. 3 is a schematic diagram illustrating a cross-sectional view taken along line BB' of the liquid crystal display panel in the second bridge circuit region shown in FIG. 1 according to the first embodiment of the present invention.

In addition, the liquid crystal display panel 100 further has a plurality of cutting lines 138 defined thereon, and the cutting lines divide the peripheral region 104 into a first peripheral region 104a and a plurality of second peripheral regions 104b. The liquid crystal display panel 100 of the present invention is not limited to have a plurality of cutting lines 138, and also can only have a cutting line 138. The cutting line 138 only divides the peripheral region 104 into a first peripheral region 104a and a second peripheral region 104b. In this embodiment, the first peripheral region 104a is disposed at an outside of each second peripheral region 104b, and each second peripheral region 104b is disposed at an outside of the display region 102 and between the display region 102 and the first peripheral region 104a. The first bridge circuit region 106 of this embodiment is disposed in the first peripheral region 104a, and each second peripheral region 104b further includes at least one second bridge circuit region 140. Referring to FIG. 3, FIG. 3 is a schematic diagram illustrating a cross-sectional view taken along line BB' of the liquid crystal display panel in the second bridge circuit region shown in FIG. 1 according to the first embodiment of the present invention. As shown in FIG. 3, the TFT substrate 108 in each second bridge circuit region 140 further includes at least one third metal layer 142, at least one fourth metal layer 144 and at least one third conductive layer 146. The third metal layer 142 is disposed on the first surface 113a of the first substrate 113, and the insulating layer 116 disposed in each second bridge circuit region 140 further has a third opening 150 that exposes a part of the third metal layer 142. The fourth metal layer 144 is disposed on the insulating layer 116, and also has the third opening 150. The passivation layer 120 in each second bridge circuit region 140 is disposed on the fourth metal layer 144, and also has the third opening 150. The passivation layer 120 in each second bridge circuit region 140 further has a fourth opening 152 that exposes a part of the fourth metal layer 144. The third conductive layer 146 is disposed on the passivation layer 120 in each second bridge circuit region 140, and the third opening 150 and the fourth opening 152 are filled with the third conductive layer 146, so that third conductive layer 146 electrically connect the third metal layer 142 and the fourth metal layer 144. Therefore, the third conductive layer 146 is regarded as a bridge circuit of the third metal layer 142 and the fourth metal layer 144. In this embodiment, the third metal layer 142 can be a part of the first metal layer 114 extending to each second bridge circuit region 140, so that the first conductive layer 122 can be electrically connected to the third conductive layer 146 through the first metal layer 114. The present invention is not limited to this. The fourth metal layer 144 of the present invention can be a part of the second metal layer 118 extending to each second bridge circuit region 140, so that the first conductive layer 122 can be electrically connected to the third conductive layer 146 through the second metal layer 118. Or, the first conductive layer 122 also can be electrically connected to the third conductive layer 146 through other conductive layers. In addition, the first conductive layer of the present invention is not limited to be electrically connected to the third conductive layer. The third metal layer 142, the third conductive layer 146 and the fourth metal layer 144 are disposed in the second peripheral regions 104b, and still remain on the liquid crystal display after the cutting process, so that the third metal layer 142, the third conductive layer 146 and the fourth metal layer 144 in each second bridge circuit region 140 can be used to be a wire layout of a driving circuit.

The CF substrate 110 in each second bridge circuit region 140 further includes a third spacer 154, disposed on the second conductive layer 130, and the third spacer 154 is directly in contact with the second conductive layer 130. The third spacer 154 and the third conductive layer 146 have a gap $G_2$ between them, and the third spacer 154 has a height $H_2$. The third spacer 154 and the first spacer 132 of this embodiment can be formed in the same process, and can be composed of photoresist materials.

Figure 4:
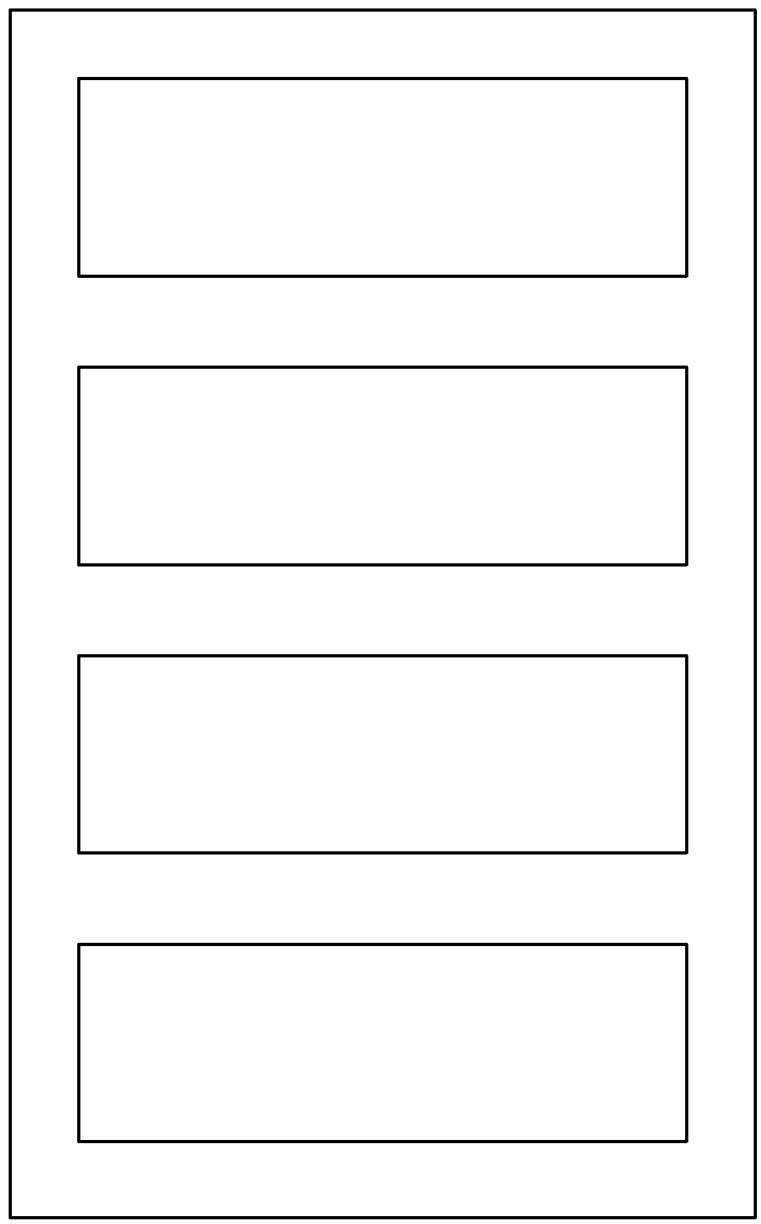
FIG. 4 is a photomask pattern used for forming the first spacer according to the first embodiment of the present invention.

In this embodiment, the first spacer 132 and the third spacer 154 are formed on the second conductive layer 130 by a deposition process and a photolithographic and etching process. Referring to FIG. 4 and referring to FIG. 2 and FIG. 3 together, FIG. 4 is a photomask pattern used for forming the first spacer according to the first embodiment of the present invention. As shown in FIG. 2 through FIG. 4, a photomask pattern 134 for forming the first spacer 132 and the third spacer 154 is a slit shape, so that a surface of the first spacer 132 facing the first conductive layer 122 and a surface of the third spacer 154 facing the third conductive layer 146 are formed to be an uneven surface during the photolithographic and etching process. The farther the distances between the first spacer 132 and the display region 102 and between the third spacer 154 and the display region 102, the smaller a thickness of the first spacer 132 and a thickness of the third spacer 154 are, so that a cell gap of the liquid crystal display panel 100 in the display region 102 being changed can be prevented. The present invention is not limited to use the photomask pattern with the slit shape to form the first spacer 132 and the third spacer 154, and can use a gray tone photomask, such as half tone photomask, phase shift photomask or a gray tone photomask formed by fine slit or fine dot. The present invention is not limited to the above-mentioned photomask.

Figure 5:
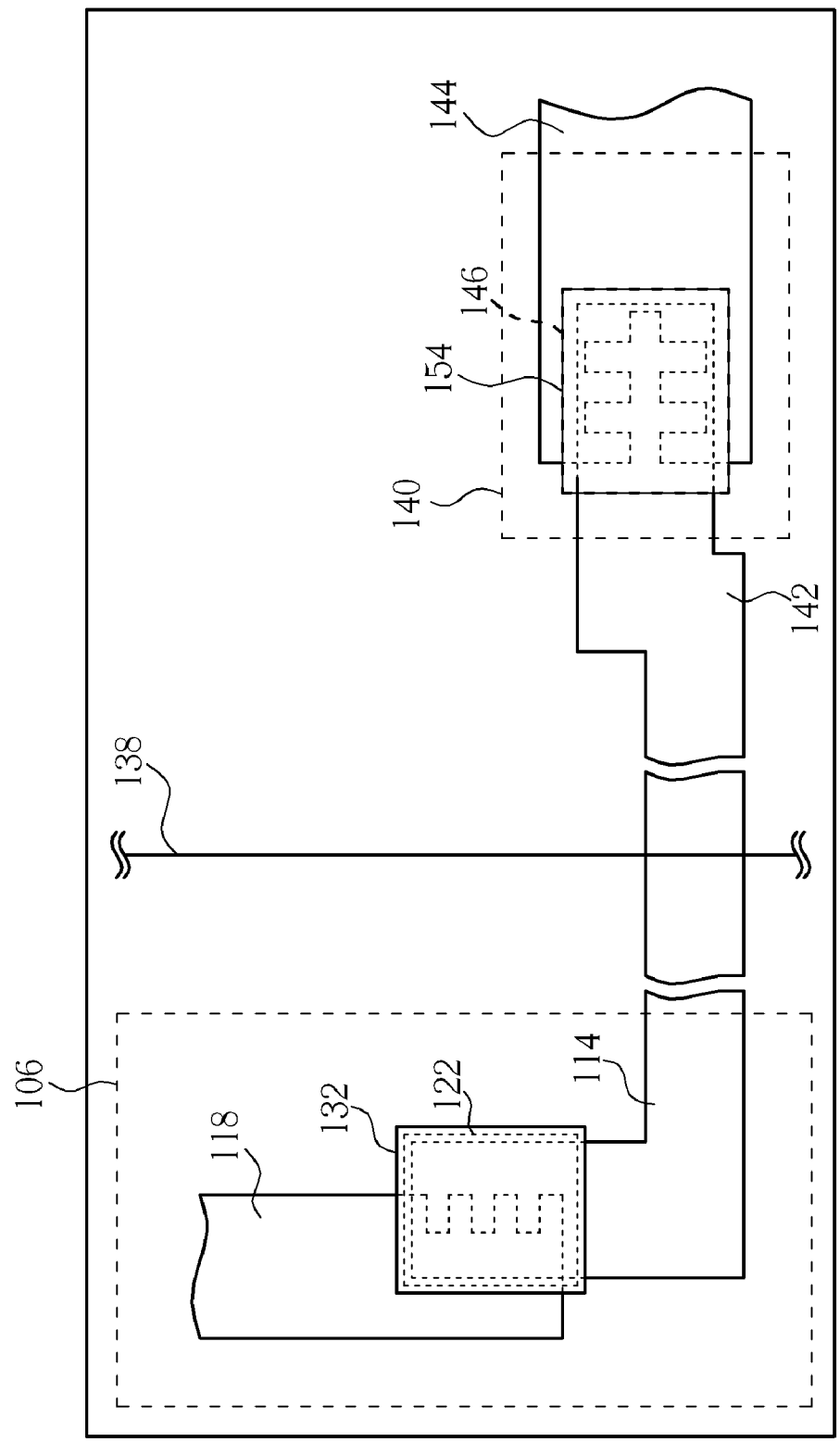
FIG. 5 is an enlarged schematic diagram illustrating the first bridge circuit region and the second bridge circuit region shown in FIG. 1 according to the present invention.
Figure 6:
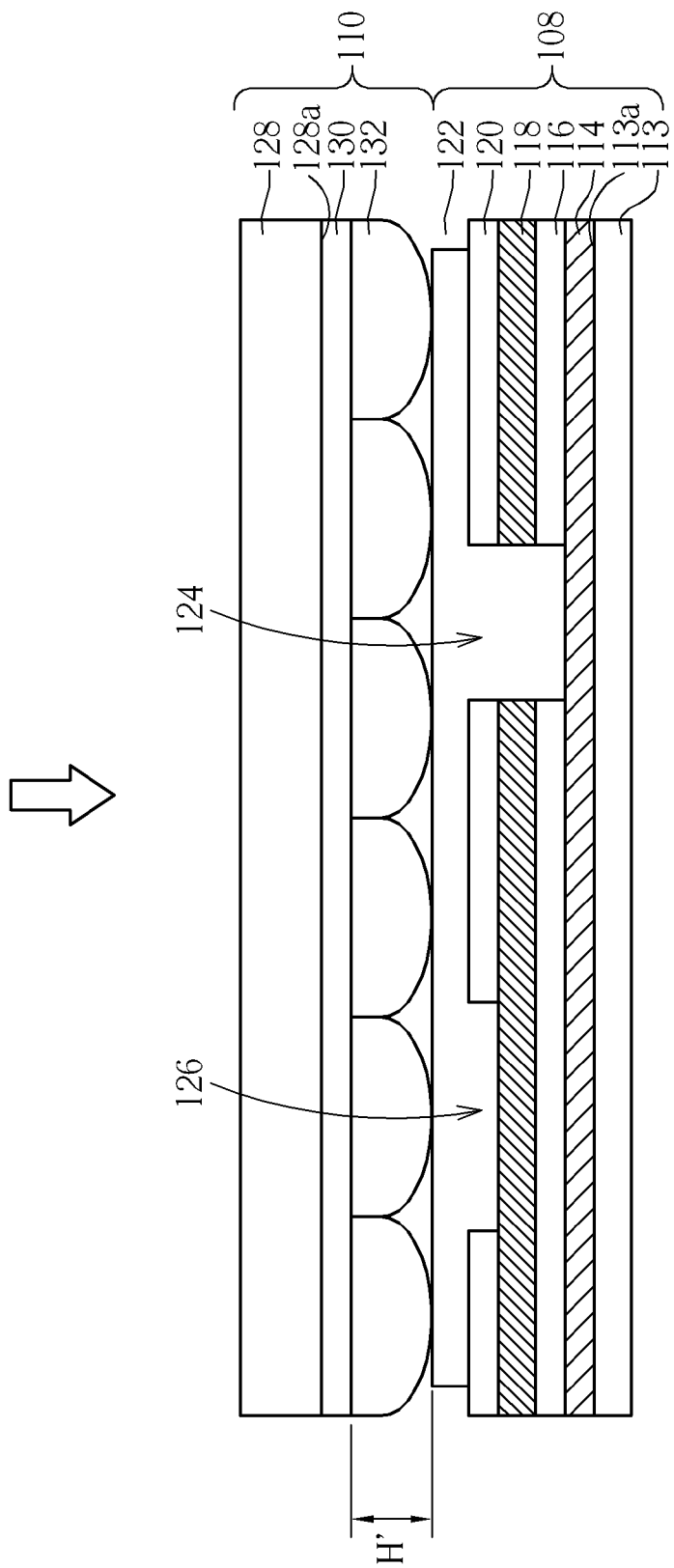
FIG. 6 is a schematic diagram illustrating a cross-sectional view of the liquid crystal display panel according to the first embodiment of the present invention being pressed.

Referring to FIG. 5 and referring to FIG. 2 and FIG. 3, FIG. 5 is an enlarged schematic diagram illustrating the first bridge circuit region and the second bridge circuit region shown in FIG. 1 according to the present invention, and FIG. 6 is a schematic diagram illustrating a cross-sectional view of the liquid crystal display panel according to the first embodiment of the present invention being pressed. As shown in FIG. 2, FIG. 3 and FIG. 5, in this embodiment, the first spacer 132 of the first bridge circuit 106 is disposed at a position of the first metal layer 114 electrically connecting the second metal layer 122. That is, the position corresponds to the first conductive layer 122. A covering area of the first spacer 132 is substantially larger than a covering area of the first conductive layer 122. In addition, the third spacer 154 in the second bridge circuit region 140 is disposed at a position of the third metal layer 142 electrically connecting the fourth metal layer 144. That is, the position corresponds to the third conductive layer 146. A covering area of the third spacer 154 is substantially equal to a covering area of the third conductive layer 146. The present invention is not limited to this, and the covering area of the first spacer also can be equal to the covering area of the first conductive layer, as shown by the third spacer in FIG. 5. The covering area of the third spacer also can substantially larger than the covering area of the third conductive layer, as shown by the first spacer in FIG. 5.

As shown in FIG. 6, when the first substrate 113 and the second substrate 128 are pressed, the first spacer 132 is directly in contact with the first conductive layer 122, and the first spacer 132 is deformed to have a height H', so that the first conductive layer 122 and the second conductive layer 130 are electrically isolated from each other. During the manufacturing process of the liquid crystal display panel 100, when the liquid crystal display panel 100 is pressed or abnormal handled, the first conductive layer 122 and the second conductive layer can be electrically isolated by the first spacer 132, and are not in contact with each other, so that a short circuit between the first conductive layer 122 and the second conductive layer 130 can be avoided. Similarly, the third spacer 154 also can be used to electrically isolate the third conductive layer 146 from the second conductive layer 130, so that a short circuit will not be generated between the third conductive layer 146 and the second conductive layer 130 when the liquid crystal display panel 100 is pressed.

Referring to FIG. 7, FIG. 7 is a schematic diagram illustrating a cross-sectional view taken along line CC' of the liquid crystal display panel in the display region shown in FIG. 1 according to the first embodiment of the present invention. As shown in FIG. 7, in the liquid crystal display panel 100 of each display region 102, the liquid crystal layer 158 is disposed between the TFT substrate 108 and the CF substrate 110, and the liquid crystal layer 158 includes at least one kind of liquid crystal molecules and at least one kind of reactive monomers. The TFT substrate 108 in each display region 102 includes a plurality of pixel electrodes 160 and a TFT array 162 (or called transistors). The TFT array 162 is disposed on the first surface 113a of the first substrate 113 in each display region 102, and includes a fifth metal layer 164 and a sixth metal layer 166. The fifth metal layer 164 of this embodiment can be formed together with the first metal layer 114 and the third metal layer 142, and be electrically connected to the first metal layer and the third metal layer. The sixth metal layer of this embodiment can be formed together with the second metal layer and the fourth metal layer, and be electrically connected to the second metal layer and the fourth metal layer. The present invention is not limited to this. The passivation layer 120 is disposed on the TFT array 162, and the pixel electrode 160 is disposed on the passivation layer 120 and electrically connected to the TFT array 162. Furthermore, the CF substrate 110 in each display region 102 includes a common electrode 168 and a plurality of second spacers 170. The common electrode 168 is disposed on the second surface 128a of the second substrate 128 in each display region 102, and is electrically connected to the second conductive layer 130, so that the common electrode 168 can be electrically connected to the outside. The second spacers 170 are disposed between the first substrate 113 and the second substrate 128 in each display region 102, so that the liquid crystal display panel 100 can have a uniform cell gap. The second spacers 170 are in contact with the TFT substrate 108, and no gap exists between the second spacers 170 and the pixel electrode 160. The second spacers 170 have a height $H_3$. It should be noted that the height $H_1$, $H_2$ of the liquid crystal display panel 100 without being pressed and the height H' of the liquid crystal display panel 100 being pressed are smaller than the height $H_3$ of the second spacers 170 to ensure the cell gap of the liquid crystal display panel 100 being uniform. The second spacers 170 are formed together with the first spacer 132 and the third spacer 154 in the same process, and the present invention is not limited to this.

When a polymer stability alignment (PSA) process is performed for the liquid crystal display panel 100, the second conductive layer 130 and the second metal layer 118 are electrically connected to a voltage source, and the voltage source provides a voltage applied between the pixel electrode 160 and the common electrode 168, so that liquid crystal molecules are rotated to a predetermined angle. The provided voltage can be a DC voltage or an AC voltage. After the PSA process, a first alignment layer (not shown in figure) and a second alignment layer (not shown in figure) are respectively formed on the TFT substrate 108 and the CF substrate 110. That is, the first alignment layer is formed on the pixel electrode 160 and the passivation layer 120 of the TFT substrate 108, and the second alignment layer is formed on the common electrode 168 of the CF substrate 110. The liquid crystal layer 158 is disposed between the first alignment layer and the second alignment layer. In other embodiments, the first alignment layer is formed on a surface of the TFT substrate 108, and the second alignment layer is formed on the CF substrate 110. The liquid crystal layer 158 is disposed between the TFT substrate 108 and the CF substrate 110. That is to say, the first alignment layer is formed on the pixel electrode 160 and the passivation layer 120 of the TFT substrate 108, and the second alignment layer is formed on the common electrode 168 of the CF substrate 110. The liquid crystal layer 158 is disposed between the first alignment layer and the second alignment layer. In addition, the liquid crystal layer 158 includes at least one kind of liquid crystal molecules, and at least one kind of reactive monomers is included between the TFT substrate 108 and the CF substrate 110. The reactive monomer can be mixed into at least one of the first alignment layer and the second alignment layer, or the monomer also can be mixed into the liquid crystal layer 158. The present invention is not limited to this. After the PSA process is performed for the liquid crystal display panel 100, the alignment process of the liquid crystal molecules is finished. As the above-mentioned, this embodiment disposes the first spacer 132 in the first bridge circuit region 106, and disposes the third spacer 154 in the second circuit region 140, so that the first conductive layer 122 and the third conductive layer 146 in the peripheral region 104 won't be in contact with the second conductive layer 130 due to the pressure or abnormal handling during any process or usage. Furthermore, damage of an internal circuit in the liquid crystal display panel 100 resulted from a short circuit generated between the pixel electrode 160 and the common electrode 168 during performing the PSA process can be avoided.

Figure 8:
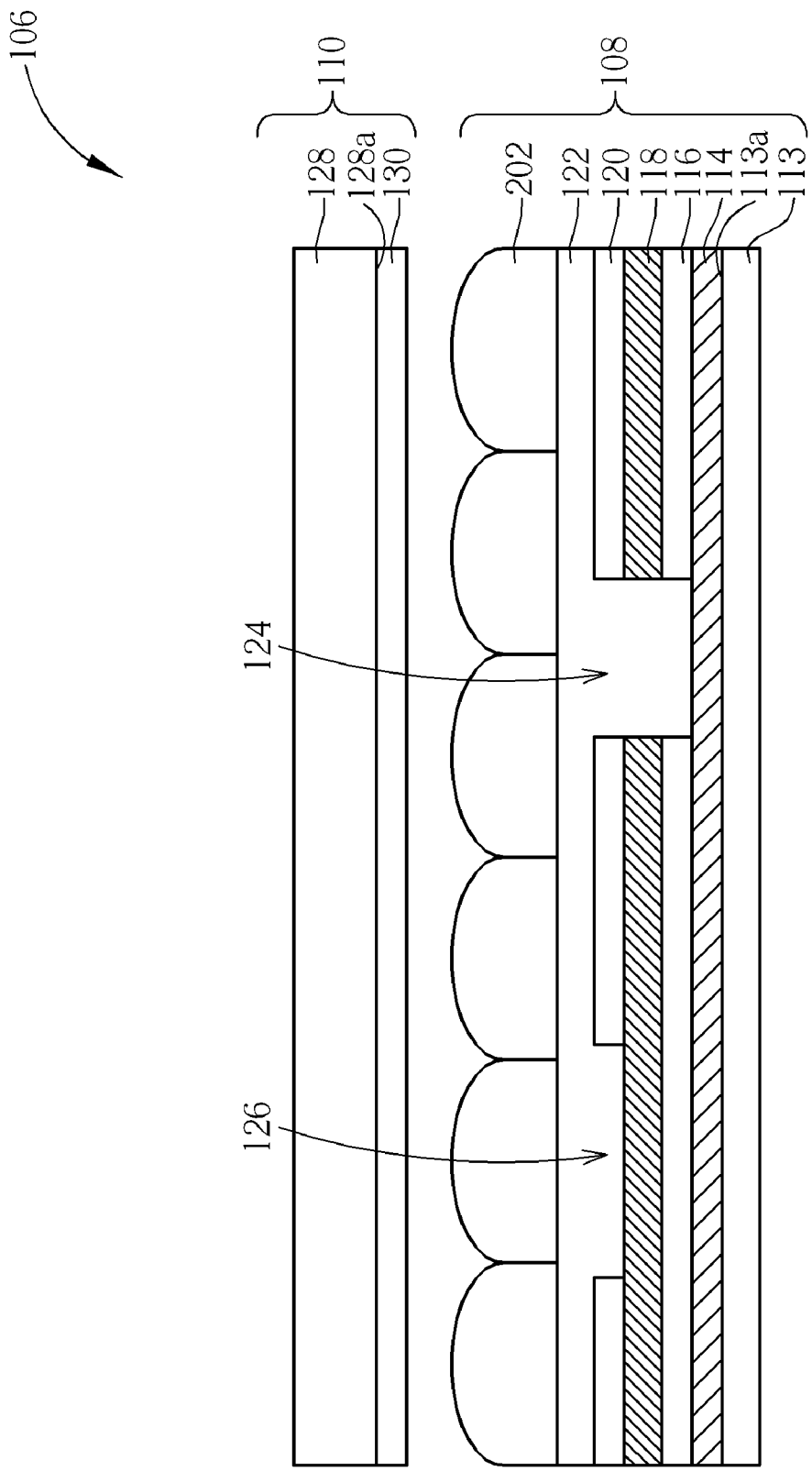
FIG. 8 is a schematic diagram illustrating a cross-sectional view taken along line AA' of the liquid crystal display panel in the peripheral region shown in FIG. 1 according to a second embodiment of the present invention.
Figure 9:
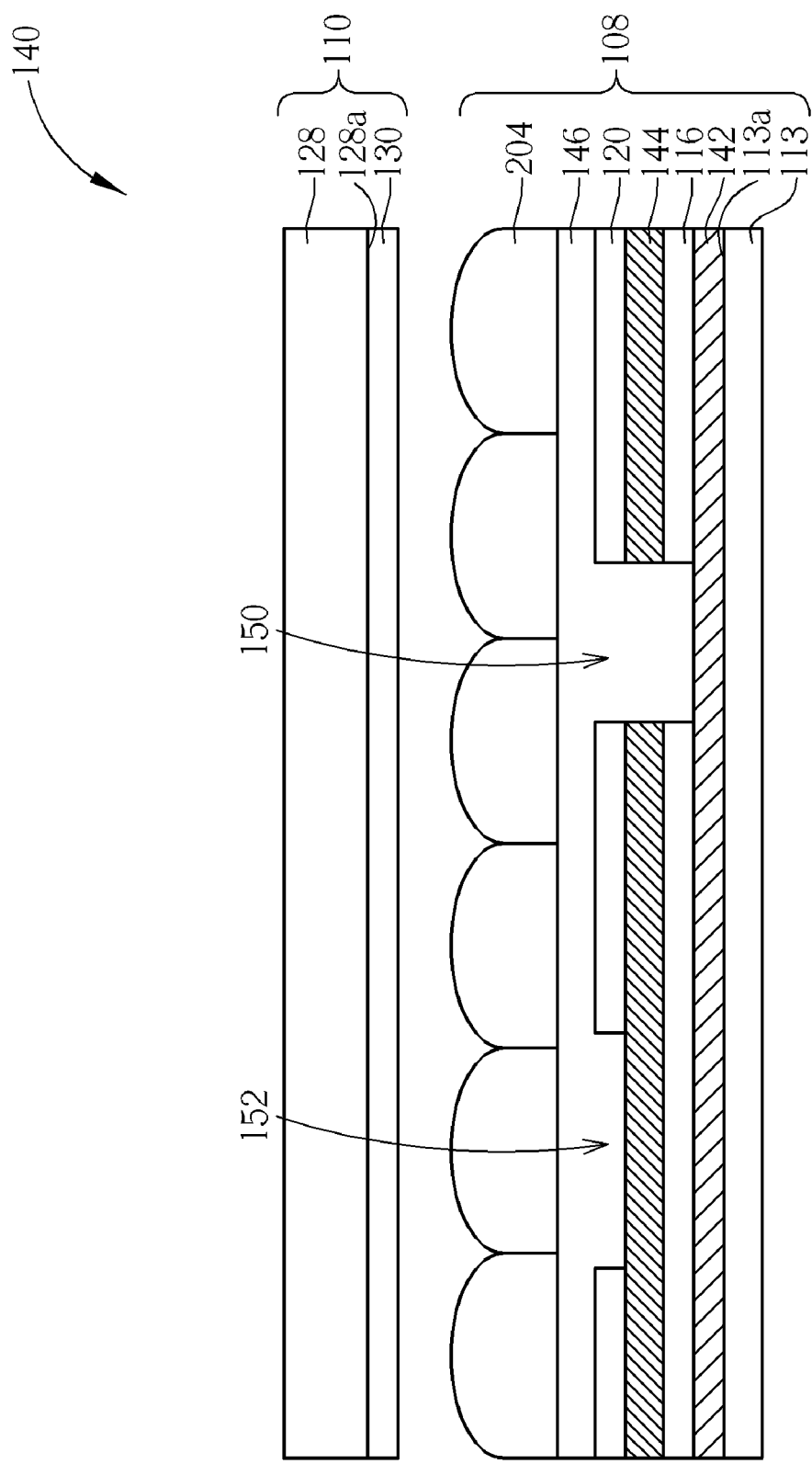
FIG. 9 is a schematic diagram illustrating a cross-sectional view taken along line BB' of the liquid crystal display panel in the peripheral region shown in FIG. 1 according to a second embodiment of the present invention.

The first spacer and the third spacer of the present invention are not limited to be disposed on the second conductive layer, and the first spacer and the third spacer also can be disposed on the first conductive layer. Referring to FIG. 8 and FIG. 9, FIG. 8 is a schematic diagram illustrating a cross-sectional view taken along line AA' of the liquid crystal display panel in the peripheral region shown in FIG. 1 according to a second embodiment of the present invention, and FIG. 9 is a schematic diagram illustrating a cross-sectional view taken along line BB' of the liquid crystal display panel in the peripheral region shown in FIG. 1 according to a second embodiment of the present invention. As shown in FIG. 8, as compared with the above-mentioned embodiment, the first spacer 202 in this embodiment covers the first conductive layer, and is directly in contact with the first conductive layer, so that the first conductive layer 122 is electrically isolated from the second conductive layer 130. Furthermore, a surface of the first spacer 202 facing the second conductive layer 130 has an uneven surface. As shown in FIG. 9, the third spacer 204 in this embodiment covers the third conductive layer 146, and is directly in contact with the third conductive layer 146, so that the third conductive layer 146 is electrically isolated from the second conductive layer 130. A surface of the third spacer 204 facing the second conductive layer 130 has an uneven surface. In addition, the first spacer and the third spacer of the present invention are not limited to be disposed on the same substrate, and the first spacer and the third spacer also can be disposed on the first substrate and the second substrate, respectively, or vice versa. The first spacer and the third spacer of the present invention are disposed respectively between the first conductive layer 122 and the second conductive layer 130 and between the third conductive layer 146 and the second conductive layer 130.

In summary, the present invention disposes the spacers between the first conductive layer and the second conductive layer and between the third conductive layer and the second conductive layer in the peripheral region, so that the first conductive layer and the third conductive layer in the peripheral region won't be in contact with the second conductive layer 130 due to abnormal handling or pressure in any process or usage. For this reason, a short circuit between the pixel electrode and the common electrode resulted from the first conductive layer being in contact with the second conductive layer or the third conductive layer being in contact with the second conductive layer in the peripheral region can be avoided, and the problem of the internal circuit of the liquid crystal display panel being easily damaged during the PSA process can be accordingly solved.

Those skilled in the art will readily observe that numerous modifications and alterations of the device and method may be made while retaining the teachings of the invention.

What is claimed is:

1. A liquid crystal display panel, having at least one display region and at least one peripheral region disposed at an outside of the display region defined thereon, and the peripheral region comprising a first bridge circuit region, the liquid crystal display panel comprising:
    a first substrate, having a first surface;
    a passivation layer, covering the first surface of the peripheral region;
    a first conductive layer, disposed on the passivation layer in the first bridge circuit region;
    a second substrate, disposed in parallel to a side of the first substrate, and the second substrate having a second surface opposite to the first surface;
    a second conductive layer, disposed on the second surface of the peripheral region; and
    a first spacer, disposed between the first conductive layer and the second conductive layer in the first bridge circuit region, and the first spacer electrically insulating the first conductive layer from the second conductive layer, wherein the first spacer is in contact with the first conductive layer, a covering area of the first spacer is substantially larger than or equal to a covering area of the first conductive layer, and a surface of the first spacer facing the first substrate or a surface of the first spacer facing the second substrate has an uneven surface, wherein the liquid crystal display panel further has at least one cutting line defined thereon, the cutting line divides the peripheral region into a first peripheral region and at least one second peripheral region, the second peripheral region is disposed at an outside of the display region, and the first peripheral region is disposed at an outside of the second peripheral region, and wherein the second peripheral region further comprises a second bridge circuit region, and the liquid crystal display panel further comprises a third conductive layer disposed on the passivation layer in the second bridge circuit region.

2. The liquid crystal display panel according to claim 1, further comprising a second spacer, disposed in the display region, and a height of the first spacer being smaller than a height of the second spacer.

3. The liquid crystal display panel according to claim 1, further comprising a first metal layer and a second metal layer, disposed between the passivation layer and the first substrate in the peripheral region, and the first metal layer and the second metal layer being electrically connected to each other through the first conductive layer.

4. The liquid crystal display panel according to claim 1, further comprising a pixel electrode and a common electrode, respectively disposed on the first surface and the second surface in the display region, the pixel electrode being electrically connected to the first conductive layer, and the common electrode being electrically connected to the second conductive layer.

5. The liquid crystal display panel according to claim 4, further comprising a liquid crystal layer, disposed between the pixel electrode and the common electrode.

6. The liquid crystal display panel according to claim 1, wherein the first bridge circuit region is disposed in the first peripheral region.

7. The liquid crystal display panel according to claim 1, further comprising a third spacer, disposed between the second conductive layer and the third conductive layer corresponding the second bridge circuit region, and the third spacer electrically insulating the third conductive layer from the second conductive layer, wherein a covering area of the third spacer is substantially larger than or equal to a covering area of the third conductive layer, and a surface of the third spacer facing the first substrate or a surface of the first spacer facing the second substrate has an uneven surface.

8. The liquid crystal display panel according to claim 7, further comprising a second spacer, disposed in the display region, and a height of the third spacer is substantially smaller than a height of the second spacer.

9. The liquid crystal display panel according to claim 1, wherein the third conductive layer is electrically connected to the first conductive layer.

* * * * *